R. E. WARDLOW.
MOTOR VEHICLE HEATER.
APPLICATION FILED MAR. 14, 1914.
1,229,835.
Patented June 12, 1917.
2 SHEETS—SHEET 1.
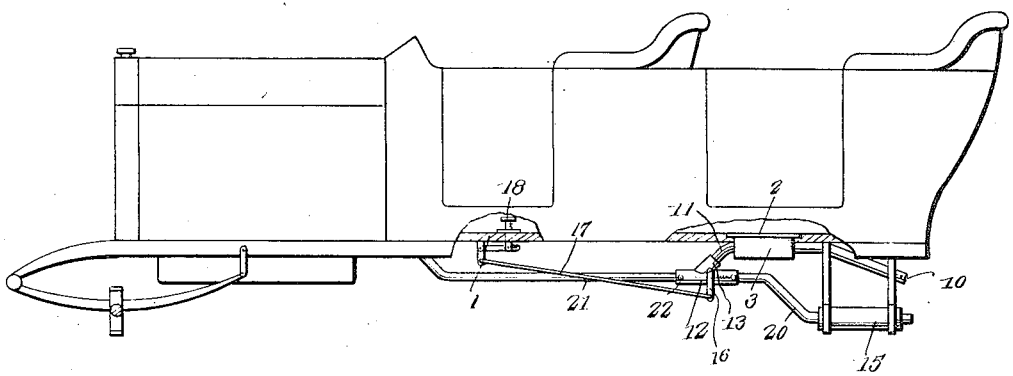
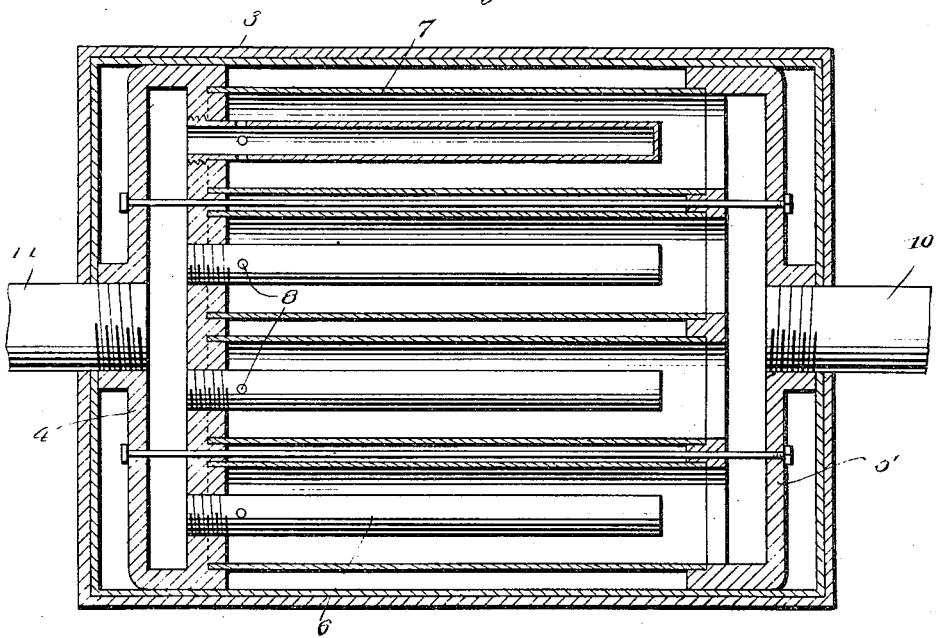
Witnesses
J. H. Crawford
S. B. Townsend
Inventor
R. E. Wardlow
By Victor J. Evans
Attorney

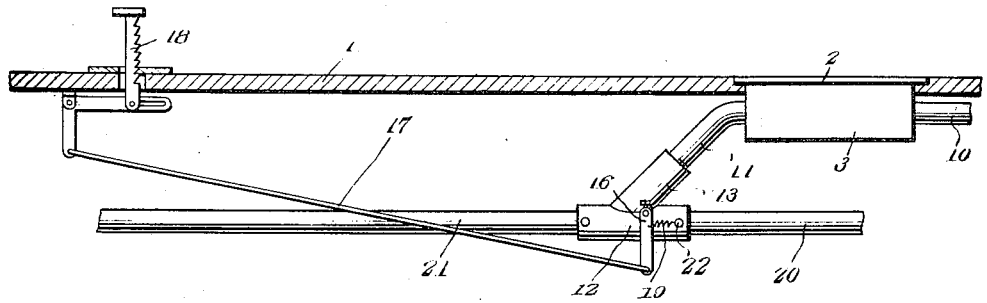
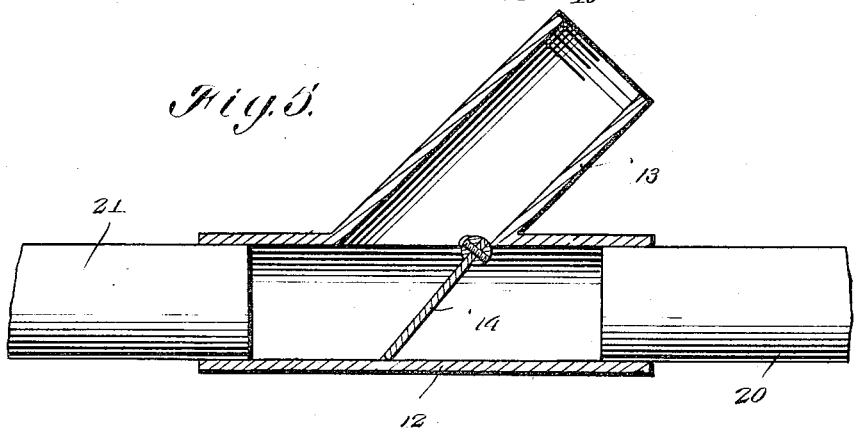
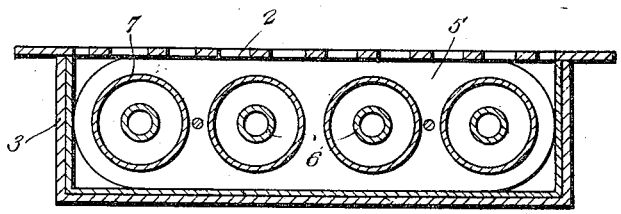

UNITED STATES PATENT OFFICE.

ROBERT E. WARDLOW, OF CINCINNATI, OHIO.

MOTOR-VEHICLE HEATER.

1,229,835.

Specification of Letters Patent.

Patented June 12, 1917.

Application filed March 14, 1914. Serial No. 824,724.

*To all whom it may concern:*

Be it known that I, ROBERT E. WARDLOW, a citizen of the United States, residing at Cincinnati, in the county of Hamilton and State of Ohio, have invented new and useful Improvements in Motor-Vehicle Heaters, of which the following is a specification.

The invention has relation to heating mechanism for motor vehicles driven by means of engines of the internal combustion variety, the purpose being to utilize the exhaust from such engine as the heating medium.

While the invention has for its object to provide a heating appliance for motor vehicles generally, the intention is the provision of a heater particularly designed for automobiles, the heater being of such construction as not to subject the occupant to unusual noise or to any dust, smoke or gases which would tend to enter the vehicle if the air from the outside were heated and permitted to enter the vehicle.

The invention further aims to provide a heater which acts and performs the same office as a muffler, the exhaust gases being discharged into the air without producing any unusual noise.

The invention also further consists of the novel features, details of construction and combination of parts which hereinafter will be more particularly set forth, illustrated and claimed.

In the drawings hereto attached :—

Figure 1 is a detail view showing the application of the invention to an automobile.

Fig. 2 is a sectional view.

Fig. 3 is an enlarged horizontal section through the heater.

Fig. 4 is a detail view showing more clearly the operating means for controlling the valve whereby the exhaust from the engine is directed through the heater or around the same.

Fig. 5 is an enlarged sectional view of the cut out.

Corresponding and like parts are referred to in the following description and indicated in all the views of the drawings by the same reference characters.

The numeral 1 designates the floor or bottom of an automobile or other type of motor vehicle, such floor having an opening which is covered by means of a grating or register 2. Beneath the opening in the floor or bottom 1 is located the heater, the same comprising a case 3 which is formed of sheet metal lined upon its inner side with asbestos or other refractory material. The case 3 is closed upon all sides to prevent air entering the same from below the floor or bottom 1, the top of the case being open to admit of the cool air entering from the body of the vehicle to be heated and the warm air passing from the case into the vehicle body. A radiator is located within the case 3 and comprises like headers 4 and 5 and intermediate tubes 6 and 7. The inner tubes 6 are connected at one of their ends with the header 4 and their opposite ends are closed. The outer tubes 7 inclose the tubes 6 and are spaced therefrom and are confined between the headers 4 and 5 and open into the header 5. Openings 8 are formed in the tubes 6 near their connection with the header 4 and provide outlets for the exhaust gases which enter the outer tubes 7. The inner tubes 6 are comparatively heavy whereas the outer tubes 7 are light or thin so as to radiate the heat. The construction of the heater is such as to prevent noise from the escape of gases, ample provision being made for the proper expansion of such gases whereby the noise producing element is eliminated. The ends of the outer tubes 7 are fitted in grooves formed in the inner or opposing walls of the headers 4 and 5. A pipe 10 connects with the header 5 and delivers the exhaust from the heater into the open air. A pipe 11 connects with the header 4 and supplies the exhaust thereto. The pipes 10 and 11 connect with the respective headers at a central point.

A hollow body 12 is formed with a lateral branch 13 which is connected with the pipe 11, such hollow body and branch constituting a fitting. A valve 14 is located within the hollow body 12 at the juncture of the branch 13 therewith, such valve serving in one position to direct the exhaust from the engine through the pipe 11 and prevent the passage of such gases through the hollow body. In the other extreme position of the valve 14 the exhaust from the engine is cut off from the branch 13 and heater and directed through the body 12 to the muffler 15 in the ordinary way. The valve 14 is fastened to a shaft which is provided at one end with a crank 16. A rod 17 connects the crank 16 with a pedal 18 under control of the operator or driver of the vehicle. A spring connection 19 connects the crank 16 with the vehicle and normally exerts a yielding force to hold the valve 14 in such position as to direct the exhaust from the engine to the heater. Pressure upon the pedal 18 moves the valve 14 against the tension of the spring connection 19 whereby the exhaust is cut off from the heater and caused to pass through the hollow body 12 and pipe 20 connected with the muffler 15. A pipe 21 connects the engine with the hollow body 12 so as to convey the exhaust to such body. The pipes 20 and 21 are slipped into the ends of the hollow body and are secured thereto by means of set screws 22. The pipes 10 and 11 pass through openings formed in opposite ends of the case 3, the openings being of a size to snugly receive the pipes thereby preventing dust or smoke from entering the case 3 from below.

It will be noted that the inner tube of each set has a lateral vent in its receiving end which communicates with the respective outer tube, permitting the imperforate end portion of the inner tube to trap or retain a portion of the fluid which acts as a turbulent cushion for the remainder of the fluid passing through the radiator. The exhaust gases from an internal combustion engine are intermittently injected or forced into the radiator and thus the portions of the gas trapped in the imperforate and closed portions of the inner tubes are kept in a turbulent condition and thereby act as variable pressure fluid cushions for the pulsating charges of exhaust gases as they are received in the radiator. By this cushioning action, the radiator in effect acts also as a muffler, silencing the exhaust from the engine and not annoying the occupants of the vehicle.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention what is claimed as new is,—

A radiator comprising opposed chambered inlet and outlet headers in spaced relation to each other, a plurality of sets of tubes each set comprising an outer tube and an inner tube concentric in relation to each other, the inner tube of each set being in communication at one end only with the inlet header and closed at the opposite end, the respective outer tube entirely inclosing the inner tube and being fastened at its ends to both headers and in communication at one end only with the outlet header, the inner tube of each set having a lateral vent near its receiving end which communicates with the respective outer tube permitting the imperforate end portion of the inner tube to trap a portion of the fluid which acts as a turbulent cushion for the remainder of the fluid passing through the radiator.

In testimony whereof I affix my signature in presence of two witnesses.

ROBERT E. WARDLOW.

Witnesses:
E. SCOTT KING,
JNO. W. WARDLOW.